United States Patent [19]

Wagenmakers

[11] Patent Number: 4,606,028
[45] Date of Patent: Aug. 12, 1986

[54] DIGITAL TRANSMISSION SYSTEM
[75] Inventor: Johannes Wagenmakers, Hilversum, Netherlands
[73] Assignee: U.S. Philips Corporation, New York, N.Y.
[21] Appl. No.: 589,901
[22] Filed: Mar. 14, 1984
[30] Foreign Application Priority Data
Mar. 29, 1983 [NL] Netherlands ................. 8301098
[51] Int. Cl.⁴ .................................. G06F 11/10
[52] U.S. Cl. ............................................ 371/49
[58] Field of Search ..................... 371/49, 51, 56
[56] References Cited
U.S. PATENT DOCUMENTS
3,113,204 12/1963 O'Brien ........................... 371/49
3,763,470 10/1973 Geng et al. ..................... 371/49
4,016,409 4/1977 Kim .................................. 371/51
4,118,686 10/1978 Lender ............................ 371/56
4,155,070 5/1979 Munter ............................ 371/49

OTHER PUBLICATIONS
Sellers, Jr. et al., Error Detecting Logic for Digital Computers, McGraw-Hill, 1968, pp. 207-211.

Primary Examiner—Charles E. Atkinson
Attorney, Agent, or Firm—Thomas A. Briody; William J. Streeter; Leroy Eason

[57] ABSTRACT

Digital transmission system comprising block code conversion supervisory means, which comprises a parity detector to which both the word to be encoded and the encoded word are applied and which further comprises means for detecting and inverting the rules of dual parity depending on the translation code used.

4 Claims, 7 Drawing Figures

| a b c d | m₁<br>A B C | m₂<br>A B C | m₃<br>A B C | m₄<br>A B C | P | H̄ |
|---|---|---|---|---|---|---|
| 0 0 0 0 | − + + | − 0 0 | − + + | − 0 0 | 1 | 1 |
| 0 0 0 1 | − + 0 | − + 0 | − + 0 | − + 0 | 1 | 1 |
| 0 0 1 0 | + − 0 | + − 0 | + 0 − | + − 0 | 1 | 1 |
| 0 0 1 1 | + 0 0 | + − − | + 0 0 | + − − | 1 | 1 |
| 0 1 0 0 | − 0 + | − 0 + | − 0 + | − 0 + | 1 | 1 |
| 0 1 0 1 | + + + | − + − | − + − | − + − | 1 | 1 |
| 0 1 1 0 | + 0 + | + 0 + | − 0 − | − 0 − | 0 | 1 |
| 0 1 1 1 | + 0 − | + 0 − | + 0 − | + 0 − | 1 | 1 |
| 1 0 0 0 | 0 + + | 0 + + | − − 0 | − − 0 | 1 | 1 |
| 1 0 0 1 | 0 + 0 | 0 − 0 | 0 + 0 | 0 − 0 | 1 | 1 |
| 1 0 1 0 | + − + | + − + | + − + | − − − | 1 | 1 |
| 1 0 1 1 | + + 0 | + + 0 | 0 − − | 0 − − | 1 | 1 |
| 1 1 0 0 | 0 0 + | − − + | 0 0 + | − − + | 1 | 1 |
| 1 1 0 1 | 0 + − | 0 + − | 0 + − | 0 + − | 1 | 1 |
| 1 1 1 0 | 0 − + | 0 − + | 0 − + | 0 − + | 1 | 1 |
| 1 1 1 1 | + + − | 0 0 − | + + − | 0 0 − | 1 | 1 |

| A B C D E | m₁<br>a b c d e f | m₂<br>a b c d e f | P(5) | P(6) | H |
|---|---|---|---|---|---|
| 0 0 0 0 0 | 1 1 0 0 1 0 | 1 1 0 0 1 0 | 0 | 1 | 1 |
| 0 0 0 0 1 | 1 1 0 0 1 1 | 1 0 0 0 0 1 | 1 | 0 | 1 |
| 0 0 0 1 0 | 1 1 0 1 1 0 | 1 0 0 0 1 0 | 1 | 0 | 1 |
| 0 0 0 1 1 | 1 0 0 0 1 1 | 1 0 0 0 1 1 | 0 | 1 | 1 |
| 0 0 1 0 0 | 1 1 0 1 0 1 | 1 0 0 1 0 0 | 1 | 0 | 1 |
| 0 0 1 0 1 | 1 0 0 1 0 1 | 1 0 0 1 0 1 | 0 | 1 | 1 |
| 0 0 1 1 0 | 1 0 0 1 1 0 | 1 0 0 1 1 0 | 0 | 1 | 1 |
| 0 0 1 1 1 | 1 0 0 1 1 1 | 0 0 0 1 1 1 | 1 | 0 1 | 1 |
| 0 1 0 0 0 | 1 0 1 0 1 1 | 1 0 1 0 0 0 | 1 | 0 | 1 |
| 0 1 0 0 1 | 1 0 1 0 0 1 | 1 0 1 0 0 1 | 0 | 1 | 1 |
| 0 1 0 1 0 | 1 0 1 0 1 0 | 1 0 1 0 1 0 | 0 | 1 | 1 |
| 0 1 0 1 1 | 0 0 1 0 1 1 | 0 0 1 0 1 1 | 1 | 1 | 1 |
| 0 1 1 0 0 | 1 0 1 1 0 0 | 1 0 1 1 0 0 | 0 | 1 | 1 |
| 0 1 1 0 1 | 1 0 1 1 0 1 | 0 0 0 1 0 1 | 1 | 0 | 1 |
| 0 1 1 1 0 | 1 0 1 1 1 0 | 0 0 0 1 1 0 | 1 | 0 | 1 |
| 0 1 1 1 1 | 0 0 1 1 1 0 | 0 0 1 1 1 0 | 0 | 1 | 1 |
| 1 0 0 0 0 | 1 1 0 0 0 1 | 1 1 0 0 0 1 | 1 | 1 | |
| 1 0 0 0 1 | 1 1 1 0 0 1 | 0 1 0 0 0 1 | 0 | 0 | |
| 1 0 0 1 0 | 1 1 1 0 1 0 | 0 1 0 0 1 0 | 0 | 0 | |
| 1 0 0 1 1 | 0 1 0 0 1 1 | 0 1 0 0 1 1 | 1 | 1 | |
| 1 0 1 0 0 | 1 1 0 1 0 0 | 1 1 0 1 0 0 | 0 | 1 | |
| 1 0 1 0 1 | 0 1 0 1 0 1 | 0 1 0 1 0 1 | 1 | 1 | |
| 1 0 1 1 0 | 0 1 0 1 1 0 | 0 1 0 1 1 0 | 1 | 1 | |
| 1 0 1 1 1 | 0 1 0 1 1 1 | 0 1 0 1 0 0 | 0 | 0 | |
| 1 1 0 0 0 | 1 1 1 0 0 0 | 0 1 1 0 0 0 | 0 | 1 0 | |
| 1 1 0 0 1 | 0 1 1 0 0 1 | 0 1 1 0 0 1 | 1 | 1 | |
| 1 1 0 1 0 | 0 1 1 0 1 0 | 0 1 1 0 1 0 | 1 | 1 | |
| 1 1 0 1 1 | 0 1 1 0 1 1 | 0 0 1 0 1 0 | 0 | 0 | |
| 1 1 1 0 0 | 0 1 1 1 0 0 | 0 1 1 1 0 0 | 1 | 1 | |
| 1 1 1 0 1 | 0 1 1 1 0 1 | 0 0 1 0 0 1 | 0 | 0 | |
| 1 1 1 1 0 | 0 1 1 1 1 0 | 0 0 1 1 0 0 | 0 | 0 | |
| 1 1 1 1 1 | 0 0 1 1 0 1 | 0 0 1 1 0 1 | 1 | 1 | |

FIG.5

| 5B | 4B | 6̄B | | 6B | | P(5) | P(6) |
|---|---|---|---|---|---|---|---|
| | | $m_1$ | $m_2$ | $m_2$ | $m_1$ | | |
| 1 1 1 1 1 | 0 0 0 0 | 1 1 0 0 1 0 | 1 1 0 0 1 0 | 0 0 1 1 0 1 | 0 0 1 1 0 1 | 1 | 1 |
| 1 1 1 1 0 | 0 0 0 1 | 1 1 0 0 1 1 | 1 0 0 0 0 1 | 0 0 1 1 0 0 | 0 1 1 1 1 0 | 0 | 0 |
| 1 1 1 0 1 | 0 0 1 0 | 1 1 0 1 1 0 | 1 0 0 0 1 0 | 0 0 1 0 0 1 | 0 1 1 1 0 1 | 0 | 0 |
| 1 1 1 0 0 | 0 0 1 1 | 1 0 0 0 1 1 | 1 0 0 0 1 1 | 0 1 1 1 0 0 | 0 1 1 1 0 0 | 1 | 1 |
| | | | | | | | |
| 1 1 0 1 1 | 0 1 0 0 | 1 1 0 1 0 1 | 1 0 0 1 0 0 | 0 0 1 0 1 0 | 0 1 1 0 1 1 | 0 | 0 |
| 1 1 0 1 0 | 0 1 0 1 | 1 0 0 1 0 1 | 1 0 0 1 0 1 | 0 1 1 0 1 0 | 0 1 1 0 1 0 | 1 | 1 |
| 1 1 0 0 1 | 0 1 1 0 | 1 0 0 1 1 0 | 1 0 0 1 1 0 | 0 1 1 0 0 1 | 0 1 1 0 0 1 | 1 | 1 |
| 1 1 0 0 0 | 0 1 1 0 | 1 0 0 1 1 1 | 0 0 0 1 1 1 | 0 1 1 0 0 0 | 1 1 1 0 0 0 | 0 | 0 1 |
| | | | | | | | |
| 1 0 1 1 1 | 1 0 0 0 | 1 0 1 0 1 1 | 1 0 1 0 0 0 | 0 1 0 1 0 0 | 0 1 0 1 1 1 | 0 | 0 |
| 1 0 1 1 0 | 1 0 0 1 | 1 0 1 0 0 1 | 1 0 1 0 0 1 | 0 1 0 1 1 0 | 0 1 0 1 1 0 | 1 | 1 |
| 1 0 1 0 1 | 1 0 1 0 | 1 0 1 0 1 0 | 1 0 1 0 1 0 | 0 1 0 1 0 1 | 0 1 0 1 0 1 | 1 | 1 |
| 1 0 1 0 0 | 1 0 1 1 | 0 0 1 0 1 1 | 0 0 1 0 1 1 | 1 1 0 1 0 0 | 1 1 0 1 0 0 | 0 | 1 |
| | | | | | | | |
| 1 0 0 1 1 | 1 1 0 0 | 1 0 1 1 0 0 | 1 0 1 1 0 0 | 0 1 0 0 1 1 | 0 1 0 0 1 1 | 1 | 1 |
| 1 0 0 1 0 | 1 1 0 1 | 1 0 1 1 0 1 | 0 0 0 1 0 1 | 0 1 0 0 1 0 | 1 1 1 0 1 0 | 0 | 0 |
| 1 0 0 0 1 | 1 1 1 0 | 1 0 1 1 1 0 | 0 0 0 1 1 0 | 0 1 0 0 0 1 | 1 1 1 0 0 1 | 0 | 0 |
| 1 0 0 0 0 | 1 1 1 1 | 0 0 1 1 1 0 | 0 0 1 1 1 0 | 1 1 0 0 0 1 | 1 1 0 0 0 1 | 1 | 1 |

FIG.7

DIGITAL TRANSMISSION SYSTEM

BACKGROUND OF THE INVENTION

1. Field of the Invention

The invention relates to a digital transmission system comprising a transmitter section which includes a coding arrangement and a receiver section which includes a decoding arrangement, at least a code translation matrix being provided between the input and the output of the coding arrangement and at least a code translation matrix being provided between the input and the output of the decoding arrangement and the transmission system comprising code conversion supervisory means.

2. Description of the Related Art

When digital signals, such as, for example, pulse code modulation signals are transmitted over large distances it is customary to use such a form of encoding in the transmitter section and such a form of decoding in the receiver section of the system that a transmission code is obtained which is adapted to the medium. This medium may, for example, consist of symmetrical, coaxial cables or optical fibres or the ether. One of the objects is usually the suppression of the d.c. component, so that alternating current couplings can be used in the system and it is possible to supply the regenerators with direct current from the system via the transmission cable. A further object is often the increase of the pulse density in the medium relative to the original binary code, or ensuring a minimum pulse density, as the case may be, so that the extraction of a clock signal, necessary for regenerative circuits, is possible.

Therefore, use is made in an encoding arrangement of what are commonly denoted as code translation Tables, for example the Tables described in Philips Telecommunication Review, Vol. 34, No. 2, June 1976, pages 72–86. Present at the input of the encoding arrangement is a series-parallel converter which divides the bit stream applied to its input into consecutive blocks having a fixed number of bits n, which consequently can occur in $2^n$ combinations. So the length of the table is $2^n$. Thereafter an n-bit block is converted with the aid of the code translation matrix into a new block having m bits according to a predetermined instruction. At the output of the encoding arrangement the m-bit blocks are reconverted by means of a parallel-series converter into a bit stream which is conveyed to the receiving section of the digital transmission system via a medium (cable, ether). In the receiver section of the system an opposite operation is performed with the aid of the decoding arrangement on the bit stream applied thereto. Examples of an encoding arrangement and a decoding arrangement are described in, for example, Proceedings 17th International Scientific Congress on Electronics, Rome Mar. 16–18, 1970, pages 275–283.

In order to monitor a correct operation of the code conversion procedure, additional characters might be added to the binary data stream in time-division multiplex (T.D.M.) prior to encoding in the transmitter section of the transmission system. These additional characters are then removed in the receiver section after decoding from the binary data stream in time-division demultiplex (T.D.D.) and can be checked there for the rules added thereto by T.D.M. This method is often in T.D.M. line equipment having a fixed frame construction as a facility.

The above-mentioned method has the disadvantage that because of the additional TDM/TDD the signaling rate should be increased somewhat and furthermore the equipment required therefor would considerably increase the overall equipment and consequently the price and the dissipation of the system. It furthermore significantly reduces the reliability in operation.

SUMMARY OF THE INVENTION

The invention has for its object to provide a supervisory system which does not have the above-mentioned disadvantages, and the system is characterized in that the code conversion supervising means in the receiving and/or transmitting section comprises a parity detector which is coupled to the inputs and to the outputs of the code translation matrix of the encoding and/or decoding arrangement.

BRIEF DESCRIPTION OF THE DRAWINGS

The invention will now be described in greater detail, by way of example, with reference to the accompanying drawings, in which:

FIG. 5 shows an example of a code Table for a 5B/6B code which may be employed in the system of FIG. 1;

FIG. 7 shows an example of the code conversion effected by the encoding arrangement in FIG. 6.

Figures 1, 2:
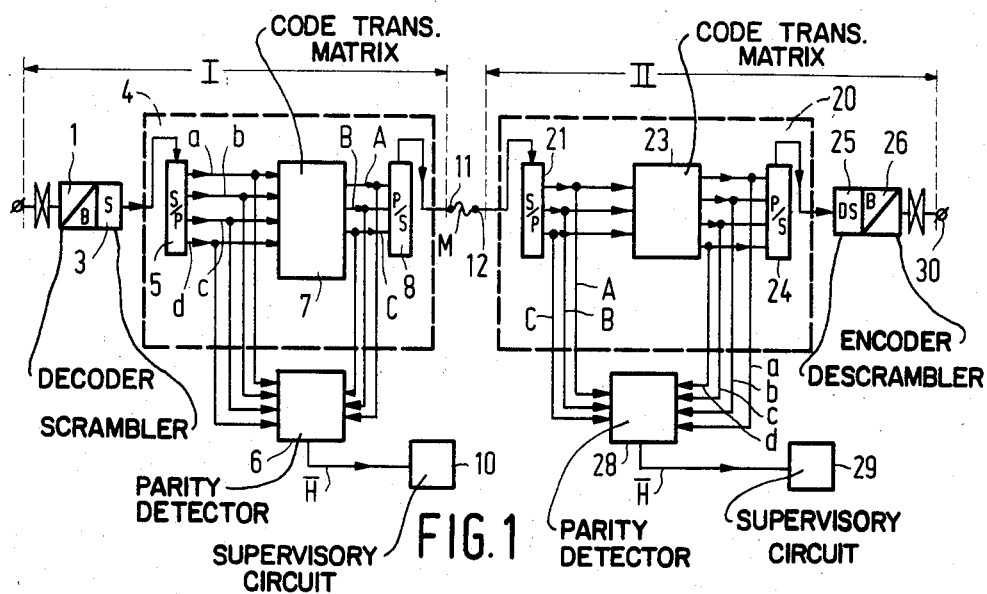
FIG. 1 shows an embodiment of a digital transmission system according to the invention.
FIG. 2 shows the code Table of a FOMOT code which may be employed in the system of FIG. 1.

In the embodiment shown in FIG. 1 reference numeral 1 denotes an interface decoding arrangement and reference numeral 3 denotes a scrambler. The output of the scrambler 3 is connected to the input of a coding arrangement comprising a series-parallel converter 5, whose outputs are connected to a like number of inputs of a code translation matrix 7. The outputs of the code translation matrix 7 are connected to a like number of inputs of a parallel-series converter 8. The output 11 of the coding arrangement 4, which is the output of the transmitter section I of the transmission system, is connected via a transmission medium M to the input 12 of the receiver section II of the transmission system, which input 12 is connected to the input of the series-parallel converter 21 of the decoding arrangement 20. The outputs of the series-parallel converter 21 are connected to a like number of inputs of the code translation matrix 23, the outputs of which are connected to a like number of inputs of a parallel-series converter 24. The output of the parallel-series converter 24 is connected to the output 30 of the transmission system via the series arrangement of a descrambler 25 and an interface encoding arrangement 26. The outputs of the series parallel converter 21 and the inputs of the parallel series converter 24 are connected to a like number of inputs of a parity detector 28, whose output is connected to a supervisory arrangement 29. Similarly, in the transmitter section I outputs of the series-parallel converter 5 and the inputs of the parallel-series converter 8 of the encoding arrangement 4 are connected to a like number of inputs of a parity detector 6, the output of which is connected to a supervisory arrangement 10.

In the embodiment shown, which can, for example, be used in 34 Mb/s and 140 Mb/s line transmission systems, use is often made of what is commonly referred to as the 4B/3T conversion code (see, for example, Philips Telecommunication Review, Vol. 34, No. 2, June 1976, pages 79–83) in order to accomplish a reduction of the signaling rate. With the aid of this code binary encoded data signals are converted into ternary encoded signals. A four-bit binary word is converted into a three-bit ternary word. The DC suppression is here obtained by limiting the value of the running digital sum, denoted R.D.S., which be understood to mean the algebraic sum of the discrete values of the transmitted symbols from a predetermined starting moment plus the content of an R.D.S.-counter which updates the sum at that starting moment (see the above-mentioned article). So as to limit the number of R.D.S. values, balanced conversion codes often use two or more encoding modes, from which the mode to be employed is selected such that with the aid of the RDS value after the preceding symbol, or blocks of symbols in the case of block codes, the said limitation is obtained. In addition the use of a limited number of RDS values with these codes creates the possibility of effecting what are commonly referred to as "error rate" measurements in intermediate regenerators and the receiving station. These "error rate" measurements are further improved by the use of scrambling. In addition to the said 4B/3T codes, use is often made in line transmission systems of what are commonly referred to as interface codes, such as, for example, HDB$_3$ and CMI, which are precisely specified or will be specified by the CCITT. With the aid of these types of codes it is possible to couple systems of different makes but having the same bit rate.

Figures 3, 4:
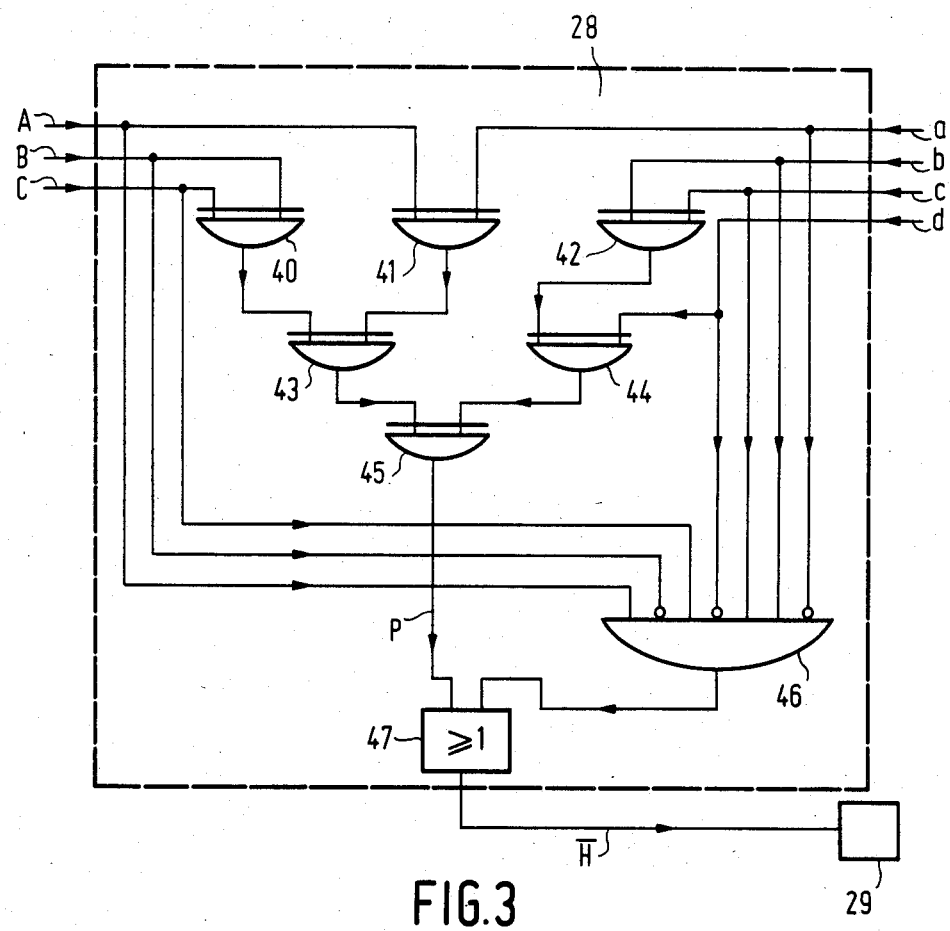
FIG. 3 shows an embodiment of a FOMOT code parity detector which may be employed in the system of FIG. 1.
FIG. 4 shows a CMI code Table.

In the Table shown in FIG. 2 an example is given of a 4B/3T code. It relates to what is commonly referred to as the FOMOT V-code, such as it is extensively described in the above-mentioned Philips Telecommunication Review. The parity P of all the characters associated with a binary words (a, b, c, d) and the corresponding ternary word are shown in a separate column. The column shows that the parity P is odd ("1"), except for the binary word 0110 corresponding to the ternary word $+0+$ or $-0-$. If this situation is considered seperately then a very useful supervisory criterion P=odd is obtained. To that end the parity detector 28 in FIG. 1 may, for example, be of a construction as shown in FIG. 3. The detector comprises six exclusive-OR gates 40, . . . 45, an AND-gate 46 and an OR-gate 47. The signals B and C are applied to the input of the gate 40 so that at the output of the gate 40 the signal B⊕C is obtained which is applied to an input of the gate 43. The signals A and $\bar{a}$ are applied to the inputs of the gate 41, so that at the input of this gate the signal A⊕$\bar{a}$ occurs, which is applied to an input of the gate 43. The signal A⊕B⊕C⊕$\bar{a}$ occurs at the output of the gate 43 and is applied to an input of the gate 45. The signals b and $\bar{c}$ are applied to the input of the gate 42 so that at the output of this gate the signal b⊕c occurs, which is applied to the input of the gate $\overline{44}$. The signal d is applied to the other input of the gate 44, so that at the output of the gate 44 the signal b⊕c⊕d occurs, which is applied to the gate 45. Then the signal $$P = A \oplus B \oplus C \oplus a \oplus b \oplus c \oplus d \quad (1)$$

occurs at the output of the gate 45. As will be apparent from the Table of FIG. 2, P=1 except for the binary word 0110. The function $\overline{H}$ which is equal to 1 for all binary words is generated with the aid of the gates 46 and 47. To that end the signal A, $\overline{B}$, C, $\bar{a}$, b, c and $\bar{d}$ are applied to the inputs of the AND-gate 46. When now the binary word 0110 and the corresponding ternary word 1, 0, 1 occurs a logic 1 which is applied to the input of the OR-gate 47 is produced at the output of the gate 46. In that case P=0 is applied to the other input of the gate 47, so that the signal $\overline{H}$=1 occurs at the output of the gate 47, thereby inverting the exception parity condition. However, if a temporary or a permanent error is produced in the FOMOT encoding arrangement 4, $\overline{H} \neq 1$ as long as this error is present (alarm condition).

As in the decoding arrangement 20 the signal processing direction is from FOMOT to BINAIR, the block 000 is illegal and its occurrence must be investigated. In the circumstances described hereafter, this ternary word can be applied to the decoding arrangement 20. If the resynchronization which has for its object to apply together the three correct ternary characters associated with one word to the decoding arrangement is disturbed, then the word 000 will occur with the probability rate p≈0.025. When the FOMOT code is used this results in the binary word 1001. An investigation of the relation (1) results in P=0 and consequently H=0, (alarm condition). The parity detector 28 then produces an alarm signal. If the block 000 occurs as the result of an interruption of the connection between the encoding arrangement 4 and the decoding arrangement 10, the parity detector 28 also produces an alarm signal, the cause of which is localized by other alarm functions in the transmission system preceding the decoding arrangement 20. Now it is possible on the one hand to maintain the illegal block 000 to assist in signaling block synchronization loss, so $\overline{H}$=0 and on the other hand the Table as it is shown in FIG. 2 can be extended by the block 000. It is, for example, possible to add the binary block 0100 thereto, as a result of which the parity has the same value for all the binary words. By using the logic functions already present in the decoding arrangement 20, the parity detector 28 can be of a very small size compared with the size of the whole decoding arrangement which is of great importance as regards price, reliability and dissipation in higher order line systems.

The code conversion in the transmitter section I of the transmissions system can be supervised with the aid of the parity detector 6, which is of a similar construction as the parity detector 28 of the receiver section II. However, no additional measures need to be taken in the parity detector 6 as regards the ternary block 000.

In the foregoing a description is given how the code conversion can be supervised in a FOMOT encoder and/or decoder arrangement with the aid of parity check of the ternary and the corresponding binary words together. Further 4B/3T codes are known, among which, in a narrower sense, the 4B/3T code (2 modes), MS43 code (3 modes) and MMS43 (4 modes). An implementation of the parity supervision is also possible for these codes, although more components are then required than for the FOMOT code.

Instead of the above-mentioned multilevel codes two-level codes such as, for example 1B/2B and 5B/6B may alternatively be used. FIG. 4a shows a code translation Table of a 1B/2B code wherein the overall parity is given in the column P and wherein $m_1$ and $m_2$ are time-alternating modes. This Table shows that the intrinsic value of the parity P is always the same for the direction 1B→2B. This will no longer be true should coding arrangement 4 be defective. For the direction 2B→1B it might alternatively be possible to use the illegal block 10, which is not shown in the Table. This dual possible exception parity condition can be detected and inverted in the same way as described in the foregoing for the FOMOT code. Another possibility would be to extend the code translation Table, as is shown in FIG. 4b, as a result of which the parity P will again have the same value for these binary words.

FIG. 5 shows a different two-level code, the so-called 5B/6B code translation Table. This translation Table shows that the modulo-2 sum P(5) of the 5 bits of the 5B word is equal to the inverse modulo-2 sum P(6) of the 6 bits of the 6B word, when the first bit A of the 5B word is equal to 0. The Table further shows that the modulo-2 sum P(5) of the 5 bits of the 5B word is equal to the modulo-2 sum P(6) of the 6 bits of the 6B word, when the first bit A of the 5B word is equal to 1. This holds for all 5B words, with the exception of the words 00111 and $\overline{00111}$, 01011 and $\overline{01011}$. When these last two words are excluded an adequate supervisory criterion for the code conversion is obtained again.

Figure 6:
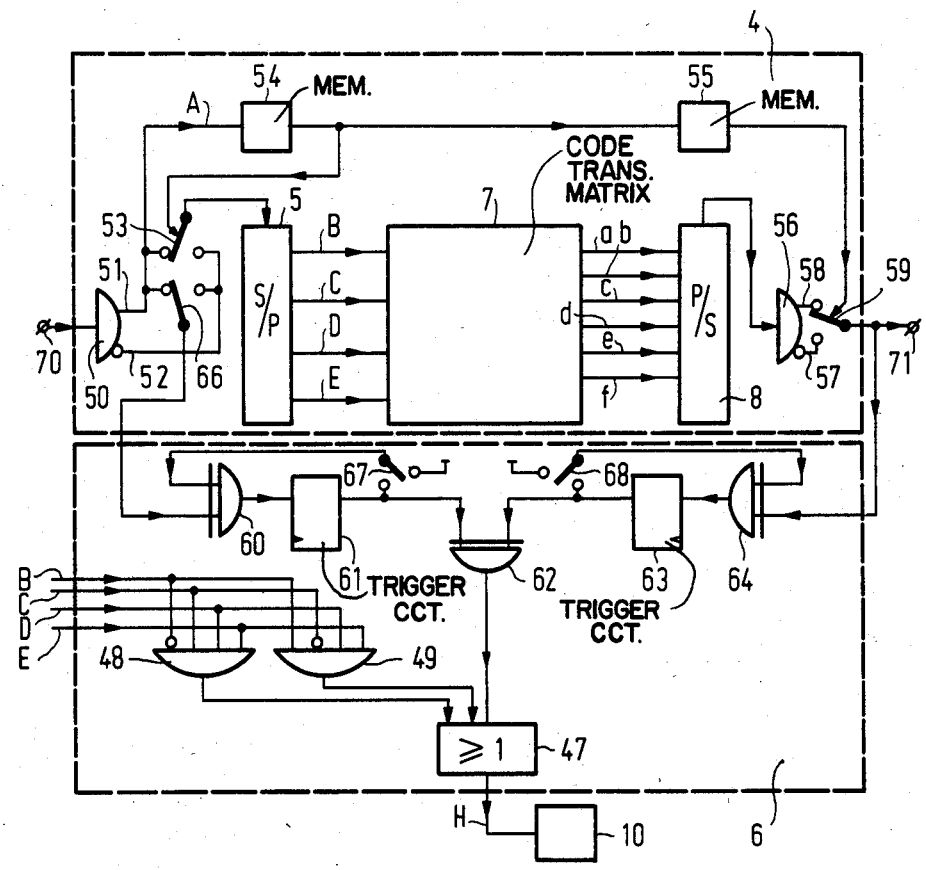
FIG. 6 shows an embodiment of an encoding arrangement for the system of FIG. 1 in which a 5B/6B code translation matrix is used.

FIG. 6 shows in greater detail how a code conversion parity detector 6 can be realized in a 5B/6B encoding arrangement. The input 70 of the encoding arrangement 4 to which the 5-bit data are applied is connected to the input of gate 50 at whose output 51 the 5-bit data are produced unaltered and at whose output 52 the 5-bit data are produced in the inverted form. The two outputs 51 and 52 of the gate 50 are each connected to a switching contact of the switch 53 whose master contact is connected to the input of the series-parallel converter 5. The outputs of the series-parallel converter 5 are connected to the inputs of the code translation network 7 whose outputs are connected to the inputs of the parallel-series converter 8. The output of the parallel-series converter 8 is connected to the input of the gate 56 at whose output 58 the 6-bit data are produced unchanged and at whose output 57 the 6-bit data are produced in the inverted form. The outputs 57 and 58 of the gate 56 are each connected to a switching contact of the switch 59 whose master contact is connected to the output 71 of the encoding arrangement 4. The output 51 of the gate 50 is connected to the input of a memory 54 whose output is connected to the input of a memory 55. The output signal of the memory 54 is used as a control signal for the switch 53. The output signal of the memory 55 is used as a control signal for the switch 59. The parity detector 6 comprises the exclusive-OR gates 60, 62 and 64, the bistable trigger circuits 61 and 63, the AND-gates 48 and 49, the OR-gate 47 and the switches 67 and 68. One input of the gate 60 is connected to the master contact of the switch 66 whose two switching contacts are each connected to an output of the gate 50. The other input of the gate 60 is connected to the output of the bistable trigger circuit 61 via switch 67. The output of the gate 60 is connected to the input of the flip-flop bistable trigger circuit 61. The output 71 of the decoding arrangement 4 is connected to an input of the gate 64, whose other input is connected to the output of the bistable trigger circuit 63 via switch 68. The output of the gate 64 is connected to the input of the bistable trigger circuit 63. The outputs of the bistable trigger circuits 61 and 63 are each connected to an input of the gate 62 whose output is connected to an input of the gate 47. The signals $\overline{B}$, C, D, E are applied to the inputs of the gate 48 whose output is connected to an input of the gate 47. The signals B, $\overline{C}$, D, E are applied to the inputs of the gate 49 whose output is connected to an input of the gate 47. The output of the gate 47 is connected to the supervisory arrangement 10.

A further analysis of the code translation Table of FIG. 5 teaches that the 6B words in the $m_1$ mode extending from 00000 to 01111 inclusive, are the inverted versions of the 6B words in the $m_2$ mode, extending from 11111 to 10000, inclusive and that the 6B words in the $m_2$ mode extending from 00000 to 01111 inclusive are the inverted versions of the 6B words in the $m_1$ mode, extending from 1111 to 10000 inclusive. This property of the translation Table is utilized in the embodiment of the encoding arrangement shown in FIG. 6 as will be described in greater detail hereinafter.

The first bit A of a 5-bit word A, B, C, D, E is applied to the memory 54 whose output signal is used to control the switches 53, 66 and 67. In addition this output signal is applied to the memory 55 which controls the switches 59 and 68. If the first bit A of the 5B word is equal to 0, then the output signal of the memory 54 is such that the switch 53 is adjusted to the position shown. This results in the subsequent 4 bits B, C, D, E of the 5B word being applied in the non-inverted form to the input of the series-parallel register 5. With the aid of the code translation matrix 7 these 4 bits are converted into a 6-bit word a, b, c, d, e, f. This 6-bit word is applied to the parallel-series register 8, whose output is connected to the input of the gate 56. When the first bit A of the 5B word is equal to 0 the memory 55 provides such a control signal that the switch 59 is adjusted to the position shown. So the output 71 of the encoding arrangement 4 is connected to the output 58 of the gate 56 and the 6B word is applied, non-inverted, to the output 71.

If the first bit A of the 5B word is equal to 1, then the output signal of the memory 54 is such that the switch 53 will be adjusted to the opposite position. The input of the series-parallel register 5 is then connected to the inverting output of the gate 50. The four bits B, C, D, E of the 5B word are applied in the inverted form to the series-parallel register 5. With the aid of the code translation matrix 7 these bits $\overline{B}$, $\overline{C}$, $\overline{D}$, $\overline{E}$ are converted into a 6-bit word $\overline{a}$, $\overline{b}$, $\overline{c}$, $\overline{d}$, $\overline{e}$, $\overline{f}$, which is applied to the parallel-series register 8. This 6B word is applied to the gate 56. The output signal of the memory 55 is now such that the output 71 of the encoding arrangement 4 is connected to the inverting output 57 of the gate 56. In this case the $\overline{6B}$ word is applied to the output 71 of the encoding arrangement 4 after having been inverted (=6B). The Table shown in FIG. 7 illustrates the data processing procedure for A=1 in greater detail.

To enable the parity check with the lowest possible number of components, use is made of what are commonly referred to as modulo-2 counters. The modulo-2 counter of the 5B word is formed by the exclusive-OR gate 60, the bistable trigger circuit 61 and the switch 67. The modulo-2 counter of the 6B words is formed by the exclusive-OR gate 64, the bistable trigger circuit 63 and the switch 68. Since the 6B modulo-2 sum P(6) must always be equal to the 5B modulo-2 sum P(5) to enable the parity check, the sum P(5) is inverted when the first bit of a 5B word is equal to 1. This is realized with the aid of switch 66. When the first bit A of the 5B word is equal to 0, the switch 66 is in the position shown and the signal input of the gate 60 is connected to the noninverting output 51 of the gate 50. If the first bit A of the 5B word is equal to 1, then the switch 66 is in the opposite position (not shown) and the signal input of the gate 60 is connected to the inverting output of the gate 50. The switch 67 is opened during the first bit A of each 5B word, causing the first bit A to be read into the counter 5. After reception of the first bit A the switch 67 is closed. This results in a signal which is equal to $$A \oplus B \oplus C \oplus D \oplus E = P(5) \text{ if } A = 0$$

$$\overline{A} \oplus \overline{B} \oplus \overline{C} \oplus \overline{D} \oplus \overline{E} = \overline{P(5)} \text{ if } A = 1$$

appearing at the output of the bistable trigger circuit 61. See the Table of FIG. 5. During the first bit $\underline{a}$ of each corresponding 6B-word switch 68 is opened, causing this first bit $\underline{a}$ to be read into the bistable trigger circuit 63. After reception of this first bit $\underline{a}$ the switch 68 is closed. This results in a signal defined by $$a \oplus b \oplus c \oplus d \oplus e \oplus f = P(6)$$

appearing at the output of the bistable trigger circuit 63. The modulo-2 sum H, where $$H = \overline{P(5)} \oplus P(6) \text{ if } A = 1$$

$$H = P(5) \oplus P(6) \text{ if } A = 0$$

appears at the output of the gate 47. This modulo-2 sum H is equal to 1 for all binary words, the binary blocks 00111, $\overline{00111}$, 01011 and $\overline{01011}$ excepted. Excluding these binary blocks is realized with the aid of the AND-gates 48 and 49. The 4 bits $\overline{B}$, C, D and E are applied to the inputs of the gate 48. This results in the four bits 0111 being applied to the input of the gate 48 at the occurrence of both the word 00111 and the word 11000 at the input 70 of the encoding arrangement 4, as the four bits B, C, D and E of the word 11000 are inverted to 0111 by means of the switch 53 as described in the foregoing. In both cases a logic 1 appears at the output of the gate 47, irrespective of the signal occurring at the output of the gate 62.

The four bits B, $\overline{C}$, D and E are applied to the inputs of the gate 49. In response thereto the four bits 1011 are applied to the input of the gate 49 at the occurrence of both the word 01011 and the word 10100 at the input 70 of the encoding arrangement 4, as the four bits B, C, D and E of the word 10100 are inverted to 1011. In both cases a logic 1 appears at the output of the gate 47, irrespective of the signal occurring at the output of the gate 62. If now a temporary or permanent error occurs in the 5B/6B encoding arrangement 4, $\overline{H}$ will be unequal to 1 for the time this error occurs. In this case the parity detector 6 applies an alarm signal to the supervisor arrangement 10.

It should be noted that the invention is not limited to the embodiments shown in FIG. 1 and FIG. 6. In these examples the data stream of bits is applied serially to the encoding arrangement, so that series-parallel converters and parallel-series converters are required for the encoding operation. There are, however, also systems, such as, for example MULDEX systems and wavelength multiplexing systems, in which the information is inherently applied already in parallel and for which consequently no series-parallel converters and parallel-series converters are required. The measures according to the invention can also be applied without further measures to these types of systems.

What is claimed is:

1. A digital transmission system comprising a transmitter section which includes an encoding arrangement and a receiver section which includes a decoding arrangement, at least one code translation matrix being provided between the input and the output of the encoding arrangement and at least one code translation matrix being provided between the input and the output of the decoding arrangement; code conversion supervisory means comprised in at least one of the receiver section and the transmitter section, such code conversion supervisory means comprising a parity detector which is coupled to the inputs and to the outputs of the code translation matrix of the section in which such code conversion supervisory means is comprised; the parity detector being adapted to detect and invert exception parity conditions arising from the translation code used by the encoding and decoding arrangements.

2. A digital transmission system as claimed in claim 1, in which a FOMOT code is used as a translation code in the encoding and decoding arrangements, a block of four binary digits a, b, d, c being translated to a corresponding block of three ternary digits A, B, C and vice versa, characterized in that in the parity detector the digits B and C, the digits A and a, and the digits b and c are applied to the inputs of respective first, second and third exclusive-OR gates, the outputs of the first and second gates being connected to the inputs of a fourth exclusive-OR gate, the output of the third gate being connected to an input of a fifth exclusive-OR gate to whose other input the digit d is applied, the outputs of the fourth and fifth gates being connected to the inputs of a sixth exclusive-OR gate whose output is connected to an input of a non-exclusive OR-gate whose other input is connected to the output of an AND gate, the AND gate having respective inputs for the logic signals A, $\overline{B}$, C, a, b, $\overline{d}$ and d.

3. A digital transmission system as claimed in claim 1, in which in the encoding arrangement a 5B/6B code is used as a translation code, a block of five binary digits A, B, C, D and E being translated to a new block of six binary digits a, b, c, d, e and f, characterized in that the parity detector comprises a first exclusive-OR gate an input of which is coupled to the input of the encoding arrangement by a first switch, and a further input of which is connected by a second switch to the input of a first bistable trigger circuit whose input is connected to the output of the first gate; and a second exclusive-OR gate an input of which is connected to the output of the encoding arrangement and whose other input is connected by a third switch to the output of a second bistable trigger circuit whose input is connected to the output of the second gate, the outputs of the first and the second bistable trigger circuits each being connected to an input of a third exclusive-OR gate whose output is connected to an input of a non-exclusive OR-gate.

4. A digital transmission system as claimed in claim 3, characterized in that the parity detector further comprises a first AND-gate having respective inputs for the binary digits $\overline{B}$, C, D and E, and a second AND-gate having respective inputs for the binary digits B, $\overline{C}$, D and E, the outputs of the two AND-gates each being connected to respective inputs of the non-exclusive OR-gate.

* * * * *